(12) United States Patent
Shore et al.

(10) Patent No.: US 6,541,419 B2
(45) Date of Patent: Apr. 1, 2003

(54) PROCESS FOR REDUCTION OF GASEOUS SULFUR COMPOUNDS

(75) Inventors: Lawrence Shore, Edison, NJ (US); Robert J. Farrauto, Princeton, NJ (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 10/183,268

(22) Filed: Jun. 27, 2002

(65) Prior Publication Data

US 2002/0178915 A1 Dec. 5, 2002

Related U.S. Application Data

(63) Continuation of application No. 09/676,837, filed on Sep. 29, 2000, now Pat. No. 6,428,761.

(51) Int. Cl.$^7$ .............................. B01J 20/00; B01J 20/02
(52) U.S. Cl. ................. 502/400; 502/325; 502/337; 502/338; 502/340; 502/345; 502/350; 502/406; 502/414; 502/415; 502/517; 502/527.12; 502/527.13; 502/527.14; 502/527.24
(58) Field of Search ....................... 423/220, 224, 423/244.01, 244.06, 244.07, 244.09, 244.1; 502/527.12, 527.13, 527.24, 300, 325, 340, 345, 350, 400, 406, 414, 5.7, 527.14, 415, 337, 338

(56) References Cited

U.S. PATENT DOCUMENTS

| | | | |
|---|---|---|---|
| 3,111,396 A | 11/1963 | Ball | ............................ 25/156 |
| 3,998,758 A | 12/1976 | Clyde | ........................ 252/466 J |
| 4,128,619 A | 12/1978 | Robinson | ..................... 423/244 |
| 4,717,552 A | 1/1988 | Carnell et al. | ............... 423/230 |
| 4,861,566 A | 8/1989 | Denny | ......................... 423/230 |
| 5,045,522 A | 9/1991 | Kidd | ........................... 502/405 |
| 5,252,528 A * | 10/1993 | Voecks et al. | ................ 502/74 |
| 5,302,470 A | 4/1994 | Okada et al. | .................. 429/17 |
| 5,306,685 A * | 4/1994 | Khare | ........................ 502/253 |
| 5,538,703 A | 7/1996 | Stephanopoulos | .......... 423/230 |
| 5,882,614 A | 3/1999 | Taylor, Jr. et al. | .......... 423/230 |
| 6,037,307 A | 3/2000 | Campbell et al. | ........... 502/325 |
| 6,139,808 A * | 10/2000 | Mizuno et al. | ............. 422/180 |

FOREIGN PATENT DOCUMENTS

| | | | |
|---|---|---|---|
| CA | 1 188 632 | 6/1985 | ............. C01B/3/16 |
| EP | 0 526 077 A1 | 3/1993 | ............ B01J/20/20 |

OTHER PUBLICATIONS

International Search Report dated Jun. 6, 2002 rendered in respect to the PCT counterpart, i.e., PCT/US 01/30163, date of completion of Search Report: May 28, 2002.
Grant and Hackh's *Chemical Dictionary* (5th Ed.), McGraw–Hill Book Co., USA; ISBN 0–07–024067–1, p. 553, 1987.*

* cited by examiner

*Primary Examiner*—Steven Bos
*Assistant Examiner*—Timothy C. Vanoy
(74) *Attorney, Agent, or Firm*—Russell G. Lindenfeldar

(57) ABSTRACT

A sulfur sorber for the reduction of gaseous sulfur compounds, e.g., $H_2S$, in a gas stream The sulfur sorber, e.g., zinc oxide, is present in the form of one or more layers on the surface of a monolith carrier, e.g., cordierite. The layers have a total thickness of at least 3 g/in$^3$ of the carrier. Preferably, the sorber is present in the form of at least three layers on the surface of the monolith carrier.

14 Claims, No Drawings

PROCESS FOR REDUCTION OF GASEOUS SULFUR COMPOUNDS

CROSS-REFERENCE TO RELATED APPLICATION

This application is a continuation of application Ser. No. 09/676,837 filed Sep. 29, 2000, now U.S. Pat. No. 6,428,761.

BACKGROUND OF THE INVENTION

1. Field of the Invention

The invention relates to a process for the reduction of the level of gaseous sulfur compounds, e.g., $H_2S$, in a gaseous stream by contacting the stream with a sorber capable of absorbing such compounds under sulfur sorbing conditions.

2. Discussion of the Prior Art

In many applications, it is well known that it is desirable to reduce the level of gaseous sulfur compounds such as $H_2S$, COS, mercaptans, etc. Many applications, e.g., fuel cells, require that the gaseous sulfur compounds in a raw fuel stream (e.g., naphtha, LPG, town gas, etc.) be reduced to as low a level as practicable in order to avoid poisoning the environment or catalysts such as steam reforming catalysts, water-gas shift catalysts, etc. Furthermore, fuel cell electrodes will rapidly become inactivated as the result of high levels of gaseous sulfur compounds in the fuel stream since the electrodes invariably contain precious metal components, e.g., platinum, which are extremely sensitive to the presence of sulfur compounds.

There are many prior art processes involving hydrogenation desulfurization in which the sulfur compounds in the raw fuel stream are decomposed by hydrogenolysis at temperatures of e.g., 350 to 400° C. in the presence of e.g., Ni—Mo or Co—Mo catalysts and thereafter the resultant $H_2S$ is then absorbed on a bed of ZnO at temperatures of e.g., 300 to 400° C. However, in these processes, the level of the $H_2S$ in the treated steam is still too high, e.g., 100 ppm and higher. However, it is well known that if the gas steam contains gaseous sulfur compounds in as little a level as 0.25 to 25 ppm, about 90% of the surface of a steam reforming catalyst such as Ru or Ni will be covered with the sulfur compounds, thereby resulting in a rapid deterioration of the catalyst. Furthermore, the prior art processes are typically not capable of reducing the level of gaseous sulfur compounds to very low levels, e.g., 100 ppb and lower since the prior art sorbers are used under conditions where severe pressure drops would otherwise occur if the flow rate of the raw fuel gaseous stream is significantly increased in order to improve the sorbing reaction rate.

Therefore, there is a need for a process which will "polish" a desulfurized fuel stream containing on the order of 25 ppm gaseous sulfur compounds such as $H_2S$ and further reduce the level of such compounds in an efficient manner to a level of less than 100 ppb for a period of at least one hour, i.e. before "breakthrough" commences. For the purposes of this invention, "breakthrough" shall be understood to mean that the level of the gaseous sulfur compounds commences rising above 100 ppb.

DETAILED DESCRIPTION OF THE INVENTION

The invention relates to an improved process for the reduction of gaseous sulfur compounds, e.g., $H_2S$ present in a gaseous stream, especially in a gaseous steam which has been pre-treated to reduce the level of gaseous sulfur compounds below 25 ppm. The improvement resides in contacting the stream with a sorber capable of absorbing such compounds under sulfur sorbing conditions, with the sorber being present in the form of one or more layers on the surface of a monolith carrier.

It was found that in the first 30 minutes of use at 400° C., bed of zinc oxide pellets allowed 20% of an 8 ppm $H_2S$ stream to break through. In contradistinction, when a monolith carrier containing 15% by weight of the zinc oxide content of the pellet bed, less than 5% of the original concentration of the $H_2S$ was allowed to pass through. In particular, it was found that highly dispersed zinc oxide present as multiple layers on a monolith carrier such as cordierite reduces the concentration of hydrogen sulfide in a gas stream to a much greater extent than almost 10 times the amount of zinc oxide in pellet form in a bed. The monolith coated with zinc oxide represent a device with a fraction of the back pressure of a bed of finely divided zinc oxide. Although the hydrogen sulfide capacity of the zinc oxide-coated monolith carrier is a fraction of that of the zinc oxide pellets, the former is capable of reducing the hydrogen sulfide concentration by $\geq 95\%$ as compared to a reduction in hydrogen sulfide of 70–90% using zinc oxide pellets.

The layers of the sorber on the monolith carrier are such that the layers will have a total thickness of at least about $3 g/in^3$ of the carrier, preferably at least 3.5 $g/in^3$ of the carrier. Preferably, the sorber will be present in the form of at least three layers on the surface of the monolith carrier. It is also preferred that the sorber be present on the surface of the monolith carrier in the form of particles having an average particle size of 90% $<10\mu$.

Typically, the sorber will comprise one or more metal compounds wherein the metal is selected from the group consisting of zinc, calcium, nickel, iron, copper and mixtures thereof. The preferred metal is zinc and the preferred metal compounds are zinc oxide and zinc titanate.

The process of the present invention operates most efficiently when the gaseous sulfur compound in the gaseous stream prior to contact with the sorber is primarily $H_2S$ present in an initial concentration of about 0.15 to about 25 ppm, preferably 0.25 to 10 ppm, and the stream is passed into contact with the sorber at a volumetric hourly rate of about 500 to about 100,000 volumes, preferably 2,500 to 15,000 volumes, per volume of monolith carrier.

Typically, the process of the present invention will result in a reduction of the $H_2S$ from its initial concentration to a level of less than 100 ppb for a period of at least one hour, preferably less than 50 ppb for at least 4 hours.

The sorber is disposed on the surface of a monolith carrier, preferably of the type comprising one or more monolithic bodies having a plurality of finely divided gas flow passages extending therethrough. Such monolith carriers are often referred to as "honeycomb" type carriers and are well known in the prior art. A preferred form of the carrier is made of a refractory, substantially inert, rigid material which is capable of maintaining its shape and a sufficient degree of mechanical conditions at high temperatures of about 1450° C. Typically, a material is selected for use as the carrier which exhibits a low thermal coefficient of expansion, good thermal shock resistance and preferably low thermal conductivity.

Two general types of materials of construction for monolith carriers are known. One is a ceramic-like porous material composed of one or more metal oxides, e.g., alumina, alumina-silica, alumina-silica-titania, mullite, cordierite, zirconia, zirconia-ceria, zirconia-spinel, zirconia-mullite, silicon-carbide, etc. A particularly preferred and commercially available material for use as the carrier for the present invention is cordierite, which is an alumina-magnesia-silica material.

Monolith carriers are commercially available in various sizes and configurations. Typically, the monolithic carrier would comprise, e.g., a cordierite member of generally cylindrical configuration (either round or oval in cross section) and having a plurality of parallel gas flow passages of regular polygonal cross sectional extending therethrough. The gas flow passages are typically sized to provide from about 50 to about 1,200, preferably 200–600, gas flow channels per square inch of face area.

The second major type of preferred material of construction for the monolith carrier is a heat- and oxidation-resistant metal, such as stainless steel or an iron-chromium alloy. Monolith carriers are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, which may range, typically, from about 200 to about 1,200 per square inch of face area.

The monolith carrier may also be present in the form of a ceramic or metal foam. Monolith carriers in the form of foams are well known in the prior art, e.g., see U.S. Pat. No. 3,111,396 and SAE Technical Paper 971032, entitled "A New Catalyst Support Structure For Automotive Catalytic Converters" (February, 1997).

The following procedure may be used to prepare the coated monolith carrier employed in the process of the invention:

A commercially available zinc oxide extrudate, e.g., "HALDER-TOPSOE HTZ-5", is ball milled for about 12 hours using alumina balls and sufficient water to prepare a suspension of 30 wt. % solids. Thereafter, the particle size distribution is measured. If 90% of the particles are $<10\mu$, the milling is complete; otherwise the milling is continued until such particle sized distribution has been achieved.

Thereafter, the slurry is placed in a container of sufficient depth such that a monolith carrier can be fully immersed in the slurry. For example, a monolith carrier of 1.5 inches in depth will require a slurry depth of about 2 inches. The monolith carrier is dipped in the zinc oxide slurry and the free-flowing excess is allowed to drain off. Blocking of the channels of the monolith carrier is minimized by blowing air across the face of the carrier through the channels. The monolith is then dried at 110° C. for one hour in an oven. The coated monolith carrier is then cooled and is weighed in order to estimate the zinc oxide loading. Thereafter, the process of immersion in the slurry, draining-off of the free flowing excess, blowing air through the channels and drying is repeated for such number of times as will result in a coated monolith carrier having the desired coating thickness, i.e., such that the layer(s) of zinc oxide will have a total thickness of at least about $3g/in^3$ of the carrier. Thereafter, the coated monolith carrier is placed in a fused silica tray and calcined at 500° C. in air in a furnace for two hours.

The zinc oxide loading, in $g/in^3$, on the monolith carrier is determined by using a weight-by-difference calculation:

$$ZnO\ g/in^3 = \frac{\text{final weight of calcined coated carrier} - \text{weight of uncoated carrier}}{\text{volume of monolith carrier}}$$

The following nonlimiting examples shall serve to illustrate the invention. Unless otherwise indicated, all amounts and percentages are on a weight basis.

EXAMPLES

A cordierite cylindrical monolith carrier of 0.75 inches diameter and 1.5 inches length with 400 channels per square inch was placed in a 1 inch diameter quart tube, using ceramic insulation to secure the sample in place. The carrier was placed in a reactor and brought to a temperature of 400° C. and a stream of nitrogen was then passed over the carrier. Thereafter, the composition of the stream was changed to 40 volume % hydrogen and 60 volume % nitrogen plus water vapor in an amount equal to 15 volume % of the stream. The signal from a hydrogen sulfide-specific analyzer was then set as the zero value. Thereafter, hydrogen sulfide was introduced into the stream in an amount of 8 ppm by volume. The hydrogen sulfide-enriched stream is passed through the sample and a measurement of the outlet gas concentration is periodically taken. When evidence of an increase of hydrogen sulfide in the outlet gas is observed, the monolith carrier lifetime is recorded, and the gas stream is switched from the reactor to a bypass line and the inlet hydrogen sulfide concentration was reduced to 1 ppm by volume. This latter step is used for instrument validation.

The results are shown in Table I in which a comparison is made of the zinc oxide layer thickness on the carrier measured in $g/in^3$ of the carrier versus the "breakthrough" time in hours. For the purpose of these examples, the "breakthrough" time is measured at the point that the concentration of hydrogen sulfide in the outlet gas steam measured >50 ppb by volume.

TABLE I

| Zinc Oxide Layer Thickness, $g/in^3$ | Breakthrough Time, hours |
| --- | --- |
| 2.1 | 1.75 |
| 2.6 | 2.0 |
| 3.7 | 8.1 |
| 3.9 | 8.4 |
| 5.1 | 9.0 |

The data set forth in Table I clearly show the dramatic increase in breakthrough time as the thickness of the zinc oxide coating on the carrier is increased to a level above about 3.0 $g/in^3$ of the carrier.

What is claimed is:

1. A sulfur sorber for reducing the level of gaseous sulfur compounds in a gaseous stream, said sorber being present in the form of at least three layers on the surface of a monolith carrier, said at least three layers having a total thickness of at least 3 $g/in^3$ of the carrier.

2. The sorber of claim 1, wherein said at least three layers have a total thickness of at least 3.5 $g/in^3$ of the carrier.

3. The sorber of claim 1 wherein the sorber comprises one or more metal compounds wherein the metal is selected from the group consisting of zinc, calcium, nickel, iron, copper and mixtures thereof.

4. The sorber of claim 3 wherein the metal comprises zinc.

5. The sorber of claim 3 wherein the metal comprises zinc oxide.

6. The sorber of claim 3 wherein the metal comprises zinc titanate.

7. The sorber of claim 1 which is present on the surface of the monolith carrier in the form of particles having an average particle size of 90%<10 $\mu$.

8. The sorber of claim 1 wherein the monolith carrier comprises a porous ceramic.

9. The sorber of claim 8 wherein the porous ceramic is present in the form of a foam.

10. The sorber of claim 9 wherein the porous ceramic is selected from the group consisting of alumina, alumina-silica, alumina-silica-titania, mullite, cordierite, zirconia, zirconia-ceria, zirconia-spinel, zirconia-mullite and silicon-carbide.

11. The sorber of claim 8 wherein the porous ceramic comprises cordierite.

12. The sorber of claim 1 wherein the monolith carrier comprises a heat- and oxidation-resistant metal.

13. The sorber of claim 12 wherein the metal is present in the form of a foam.

14. The sorber of claim 1 wherein the monolith carrier is comprised of a composition comprising stainless steel or iron/chromium alloy.

* * * * *